United States Patent [19]
Nirshberg et al.

[11] Patent Number: 5,699,421
[45] Date of Patent: Dec. 16, 1997

[54] TELEPHONE ANSWERING DEVICE WITH LOW COST DUAL TONE MULTI-FREQUENCY DETECTOR

[75] Inventors: Alex Nirshberg, Torrance; Mark J. Karnowski, Westminster; Frank Sacca, West Covina, all of Calif.

[73] Assignee: Casio PhoneMate, Inc., Torrance, Calif.

[21] Appl. No.: 455,226

[22] Filed: May 31, 1995

[51] Int. Cl.$^6$ .............................. H04M 1/00; H04M 3/00; G08C 19/00; G06F 17/10
[52] U.S. Cl. .............................. 379/386; 327/46; 327/47; 327/94; 327/552; 340/825.73; 364/724.08; 379/77; 379/283; 379/372; 379/387
[58] Field of Search ............................... 379/67, 88, 89, 379/283, 351, 386, 387, 372, 77, 74, 31; 327/46, 1, 39, 40, 41, 42, 43, 44, 45, 47, 94, 552; 340/825.71, 825.73, 825.74, 825.48; 364/484, 487, 724.08; 370/526

[56] References Cited

U.S. PATENT DOCUMENTS

| | | | |
|---|---|---|---|
| 4,091,243 | 5/1978 | Mizrahi et al. | 379/283 X |
| 4,273,965 | 6/1981 | Cowpland | 379/283 X |
| 4,333,150 | 6/1982 | Matty et al. | 379/386 X |
| 4,502,049 | 2/1985 | Atkinson | 379/386 X |
| 4,521,647 | 6/1985 | Olson et al. | 379/351 |
| 4,860,340 | 8/1989 | Suzuki et al. | 379/283 X |
| 4,868,872 | 9/1989 | Roberts et al. | 379/386 |
| 5,313,516 | 5/1994 | Afshar et al. | 379/67 |

OTHER PUBLICATIONS

Article entitled "Implementation and Applications Around Standard MPF", SGS-Thomson Microelectronics, Application Note, ANO61/0389, pp. 955-968.

*Primary Examiner*—Harry S. Hong
*Attorney, Agent, or Firm*—Frishauf, Holtz, Goodman, Langer & Chick

[57] ABSTRACT

A telephone answering device (TAD) includes a remote access mode which is operative responsive to dual tone multi-frequency (DTMF) signals. At least three bandpass filters each receive an input signal from a telephone line interface provided in the TAD. A software controlled sampling section receives outputs from all the bandpass filters for sampling outputs from the bandpass filters, the sampling section including a multiplexer which receives the outputs from all of the bandpass filters, and a peak hold circuit coupled to an output of the multiplexer. An analog-to-digital converter receives an output from the peak hold circuit, and a digital controller receives the output of the analog-to-digital converter for controlling operations of the TAD in a remote access mode responsive to the detected DTMF signals. First and second ones of the bandpass filters have respective center frequencies corresponding to frequencies of respective DTMF signals and a third bandpass filter has a different center frequency. The absence of an output from the third filter confirms that there is no noise or other undesirable signals that would indicate that an incoming signal is not a DTMF signal. At least one of the bandpass filters preferably is a switched capacitor filter having a center frequency which is switchable between at least two different center frequencies. At least the bandpass filters, multiplexer, peak hold circuit and analog-to-digital converter are all included in a single application specific integrated circuit (ASIC).

44 Claims, 4 Drawing Sheets

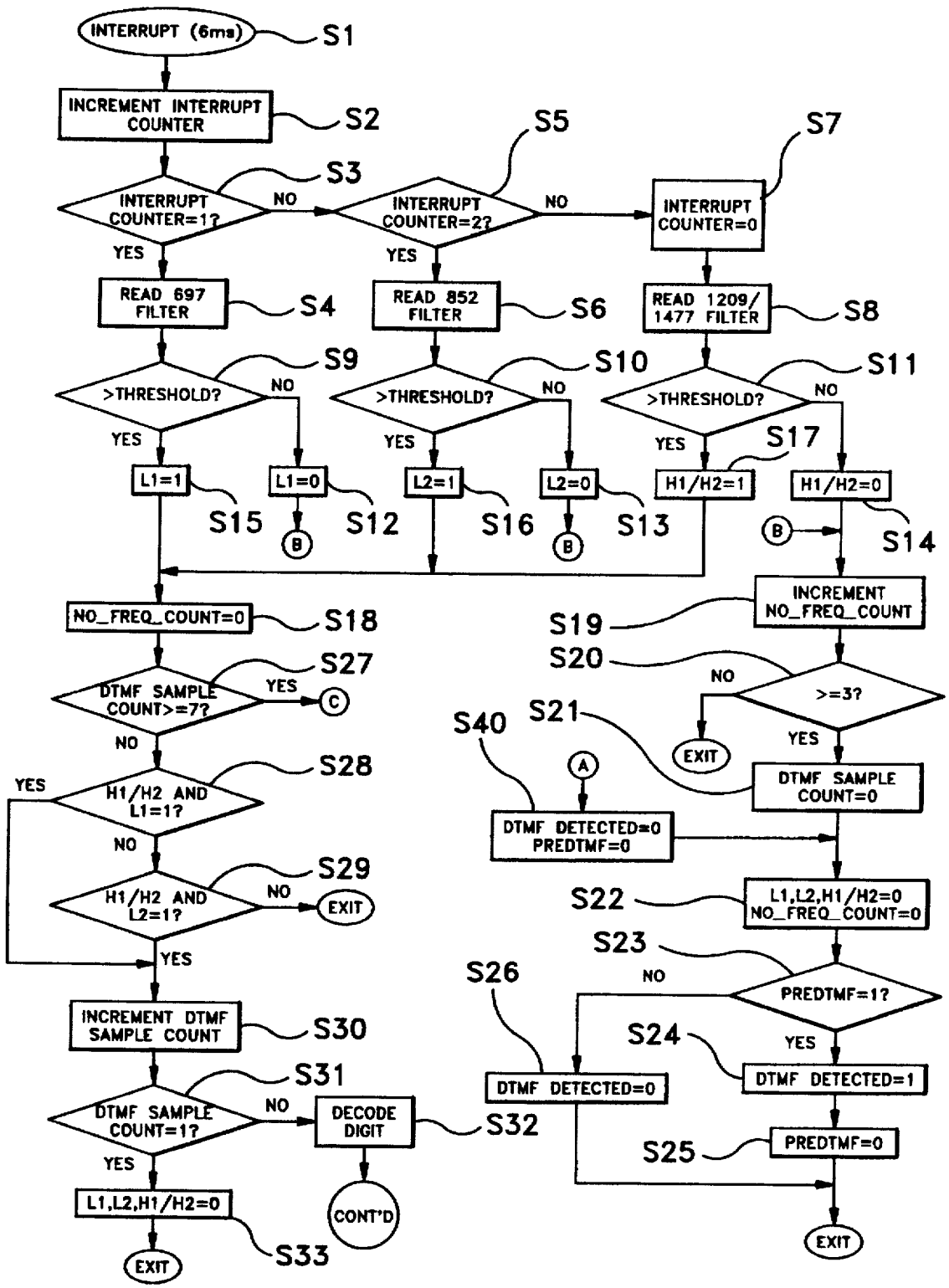

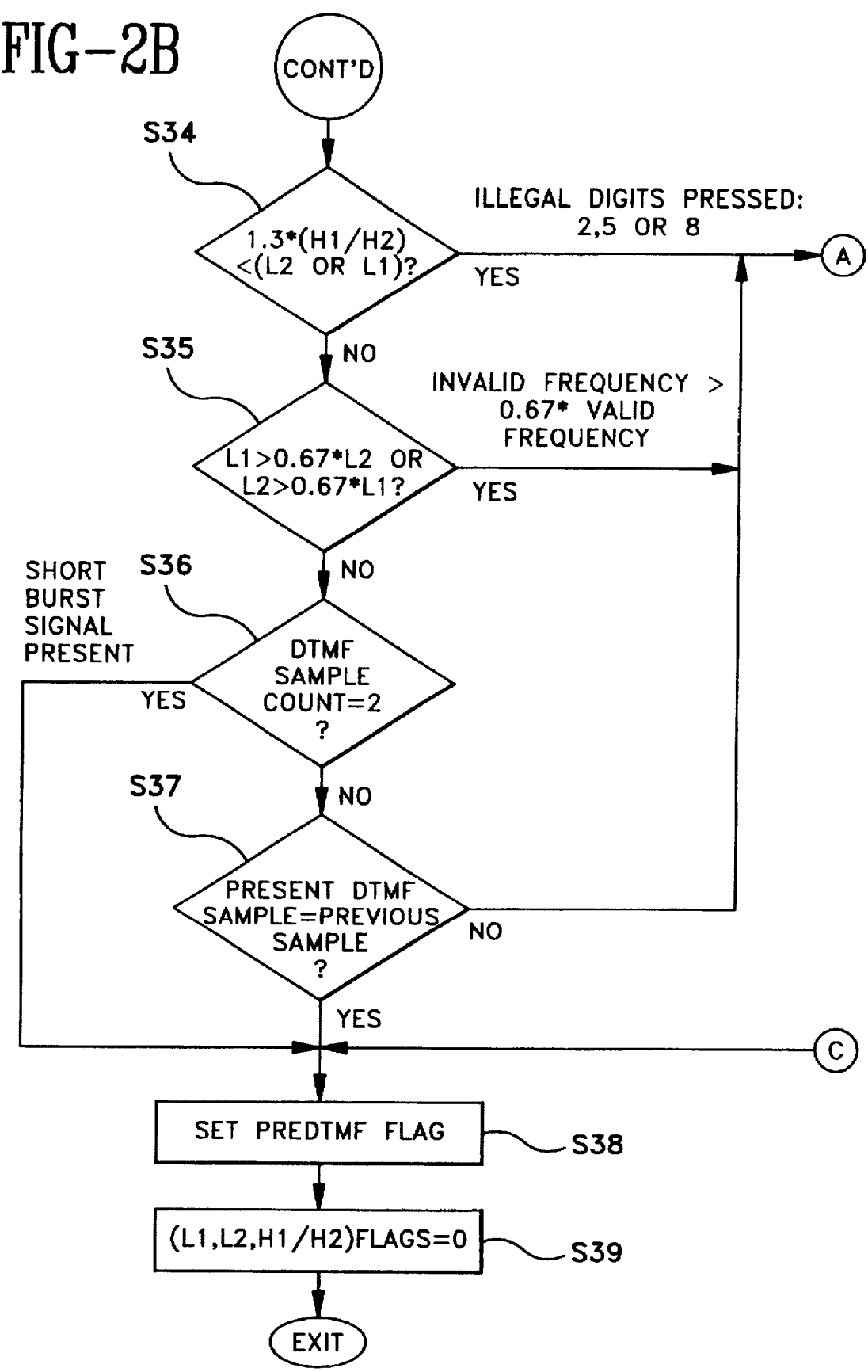

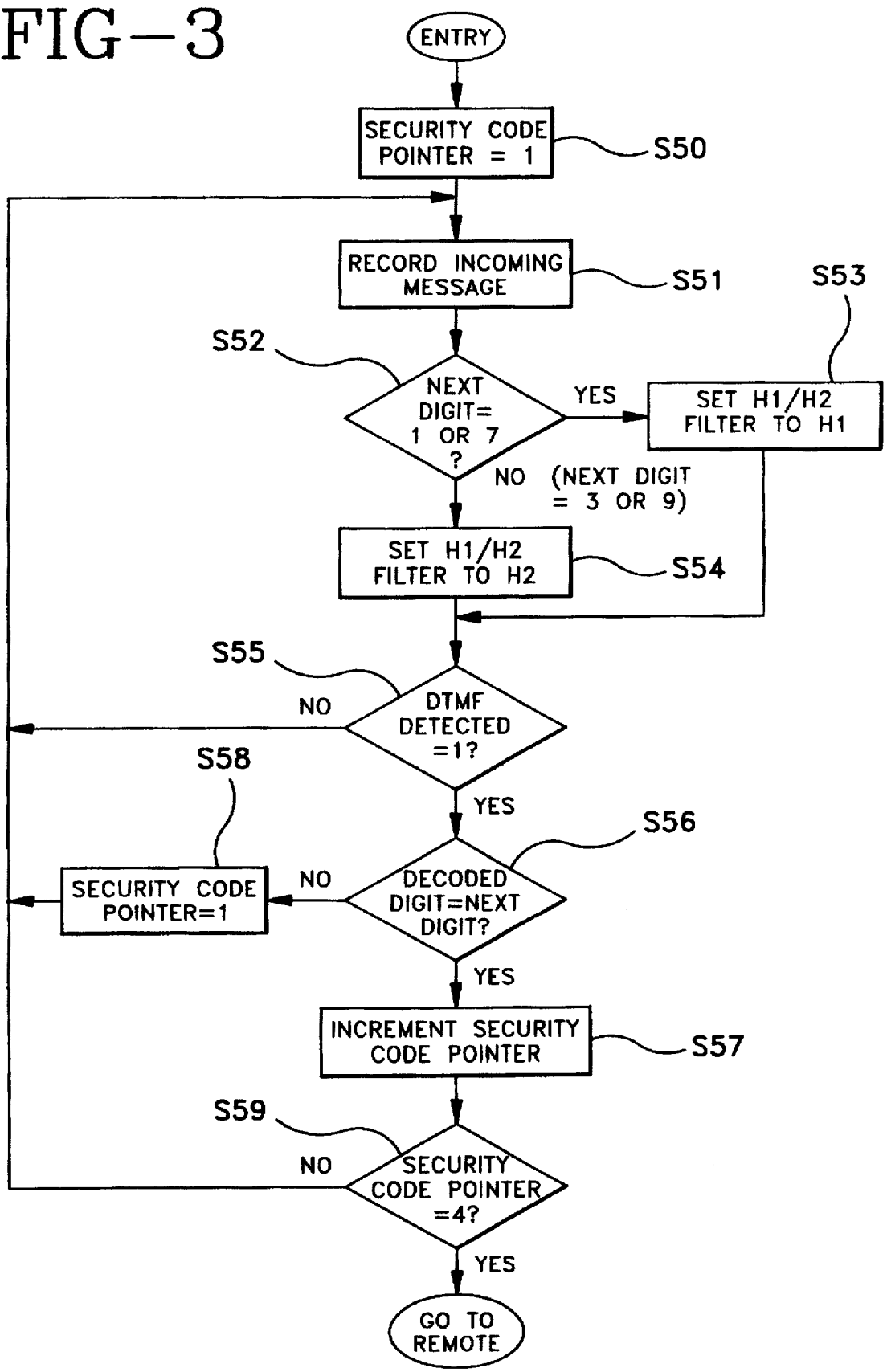

TELEPHONE ANSWERING DEVICE WITH LOW COST DUAL TONE MULTI-FREQUENCY DETECTOR

BACKGROUND OF THE INVENTION

The present invention relates to telephone answering devices, and more particularly to detection of dual tone multi-frequency (DTMF) signals that comprise a remote access code in a telephone answering device and for distinguishing these signals from speech and other extraneous noise in a way that is quick, efficient, inexpensive and is easily implemented in an application specific integrated circuit (ASIC).

Dual tone multi-frequency (DTMF) detection of remote access codes in telephone answering devices (TAD's) is well known in the art. The remote access code is the preprogrammed numerical code that a TAD owner enters using a touch-tone telephone at a remote location in order to access his or her answering machine. Once the owner has accessed the TAD, he or she can perform various functions remotely, using DTMF signals. These remotely controlled functions could include listening to any messages that have been recorded in the owner's absence, saving or erasing any prerecorded messages, changing the outgoing message, etc. The TAD should respond only to the specific combination of DTMF signals that it was programmed to respond to. It should not respond to voice signals or to any other extraneous noise on the telephone line.

It is important for telephone answering devices (TAD's) to distinguish between DTMF signals and speech and/or noise so that the voice of a caller leaving a message is not mistaken by the TAD as being the remote access code to which it is programmed to respond. If this was to happen, the TAD might, for example, initiate playback of messages that were previously recorded instead of allowing the caller to continue recording his or her message. The efficiency and speed with which the TAD detects the DTMF signals are important as well. The more efficient the process, the better able the system will be to detect the DTMF signals and identify them as the remote access code. The faster this process is accomplished, the better able the system will be to handle all types of incoming tones, including so called "short burst" tones, which may be as short as 70 ms. Short burst tones are found on many telephone instruments, particularly cellular, cordless and some pay telephones.

DTMF detection circuits typically use filters to process signals coming from the telephone line. The filters allow signals of specified frequency ranges (bands) to pass through and attenuate signals at all other frequencies. The signals that are allowed to pass through the filters include the DTMF signals that are transmitted when certain digit buttons are pressed on a touch tone telephone keypad. The outputs of the filters are read (assuming that the signals are a certain percentage above a reference level) and an algorithm is used to determine if a DTMF signal has been detected and, if so, if that signal is valid. If the DTMF signals are valid, the TAD allows the user to access its various functions.

Integrated circuits, which have the hardware required to perform DTMF detection embedded in them, are often used to reduce costs. The quality and quantity of the filters used in the integrated circuit also affects the cost. The more filters that are used, and the sharper the exclusion (pass band) of these filters, the more expensive the TAD will be to manufacture. Although it is possible to use cheaper and fewer filters to perform DTMF detection, one has to be careful not to compromise the speed with which the TAD detects DTMF signals or to increase its susceptibility to false triggering by voice signals. For instance, phase locked loop (PLL) integrated circuits have only one filter (thus reducing cost) but their detection of DTMF signals is very slow in order to prevent false triggering. This slow detection time will result in the TAD's inability to detect short burst tones.

DTMF detection in a TAD is a much simpler process than general purpose DTMF detection (that which is used in a central telephone office, for example). In general purpose DTMF detection schemes, the circuit must be ready to detect any one of twelve possible digits at any given time. By contrast, the TAD is usually set to respond to a reduced number of specific DTMF signals as part of a remote access code. Therefore, the TAD is "looking" for a limited subset of the twelve available digits. A TAD generally "knows" which digit(s) it is looking for and will ignore any DTMF signals that do not correspond to that particular digit(s).

DESCRIPTION OF THE PRIOR ART

U.S. Pat. No. 4,868,872 (Roberts et al) describes a telephone tone detector. Roberts et al teaches a circuit that splits the received signals into bands and uses a complicated hardware-based algorithm to detect and qualify frequencies. Roberts et al uses two filters; a high group filter and a low group filter. If a pair of frequencies (one from each group) is detected, then a valid DTMF signal is considered to be present. In Roberts et al, the incoming signals are tracked simultaneously (in parallel). This is more expensive than tracking the signals one at a time (serially) because more analog-to-digital converters are required. The high order band-split filter that must be used in Roberts et al also adds cost.

U.S. Pat. No. 4,273,965 (Cowpland et al) describes a tone decoding circuit. The Cowpland et al circuit uses a frequency (period)-to-voltage converter and comparators to compare the resultant voltages. It also uses a voltage divider and determines the DTMF signal based on a ratio of voltages. This approach is difficult to implement and is expensive. It requires a plurality of comparators; one for each frequency and one to detect DTMF. Like Roberts et al, Cowpland et al also separates the low group of frequencies from the high group. Cowpland essentially reaches an analog version of the Roberts et al circuit.

U.S. Pat. No. 4,521,647 (Olson et al.) describes a tone detection system and method. Olson et al teaches a method of detecting DTMF during the broadcast of an outgoing message to the telephone line. Detecting DTMF signals in the presence of voice signals is difficult and requires a more complex circuit than a circuit designed just to prevent voice signals from inadvertently activating the TAD. A gain circuit and an auto level adjust circuit are also required to condition the signals in the Olson et al apparatus. The gain circuit is coupled to the automatic level adjust circuit and to the DTMF detector as well.

U.S. Pat. No. 4,860,340 (Suzuki et al) describes a DTMF signal discriminating circuit. Suzuki et al requires a separate filter for each frequency. The output of each filter is looked at to determine the presence of DTMF signals. The main purpose of the Suzuki et al circuit is to reject the outgoing message. As in Olson et al, this requires complex circuitry. The Suzuki et al circuit would be expensive to implement due to the multiple filters required. Also, one would need to use higher order (more expensive) filters for the Suzuki et al apparatus to perform properly.

SUMMARY OF THE INVENTION

According to the present invention, a telephone answering device includes a remote access mode which is operative responsive to dual tone multi-frequency (DTMF) signals, wherein input signals are coupled to a telephone line interface included in the telephone answering device. The improvement of the present invention comprises at least three bandpass filters coupled to receive a signal from the line interface; and a sampling section coupled to receive outputs from all of the bandpass filters for sampling outputs from the bandpass filters, the sampling section including a multiplexer which receives said outputs from all of the at least three bandpass filters; and a peak hold circuit coupled to an output of the multiplexer. The improvement further comprises an analog-to-digital converter coupled to receive an output from the peak hold circuit; and a controller coupled to an output of the analog-to-digital converter for controlling operations of the telephone answering device in a remote access mode responsive to the detected DTMF signals.

In a preferred embodiment, the sampling section is controlled by an output of the controller.

According to a further aspect of the invention, the at least three bandpass filters includes at least one bandpass filter having a switchable center frequency which is switchable between two different center frequencies.

Preferably, the first and second bandpass filters have respective center frequencies corresponding to respective DTMF signals for detecting the presence of the respective DTMF signals; and a third bandpass filter has a different center frequency which is used to detect a presence of noise or other undesirable signals that would indicate that an incoming signal is not a DTMF signal. If such a third bandpass filter provides no output, this confirms that no non-DTMF signals are present in the incoming signal. The first, second and third bandpass filters are preferably connected in parallel.

According to another aspect of the invention, at least the bandpass filters, multiplexer, peak hold circuit and analog-to-digital converter are all included in a single application specific integrated circuit (ASIC). Preferably, an automatic gain control circuit couples an output of the line interface to the bandpass filters, and the AGC circuit is also preferably included in the single application specific integrated circuit (ASIC).

In a preferred arrangement, outputs of the at least three bandpass filters are sampled under software control, individually and sequentially, on a periodic basis by the multiplexer and peak hold circuit. By using this technique, a single multiplexer and peak hold circuit is used for sampling outputs of all of the at least three bandpass filters. Also, the at least three bandpass filters each preferably comprise second order filters.

According to a feature of the present invention, at least one of the bandpass filters has a switchable center frequency, the at least one bandpass filter which has such a switchable center frequency comprising a switched capacitor filter which provides such switchable center frequencies.

BRIEF DESCRIPTION OF THE DRAWINGS

Reference will be made to preferred embodiments of the invention, examples of which are illustrated in the accompanying drawings. Although the invention will be described in the context of these preferred embodiments, it should be understood that it is not intended to limit the spirit and scope of the invention to these particular embodiments.

FIGS. 2A and 2B together comprise a flow chart showing operation of the apparatus of FIG. 1; and FIG. 3 is a flow chart showing how a typical telephone answering device (TAD) operates using the system of the present invention.

DETAILED DESCRIPTION OF THE INVENTION

Figure 1:
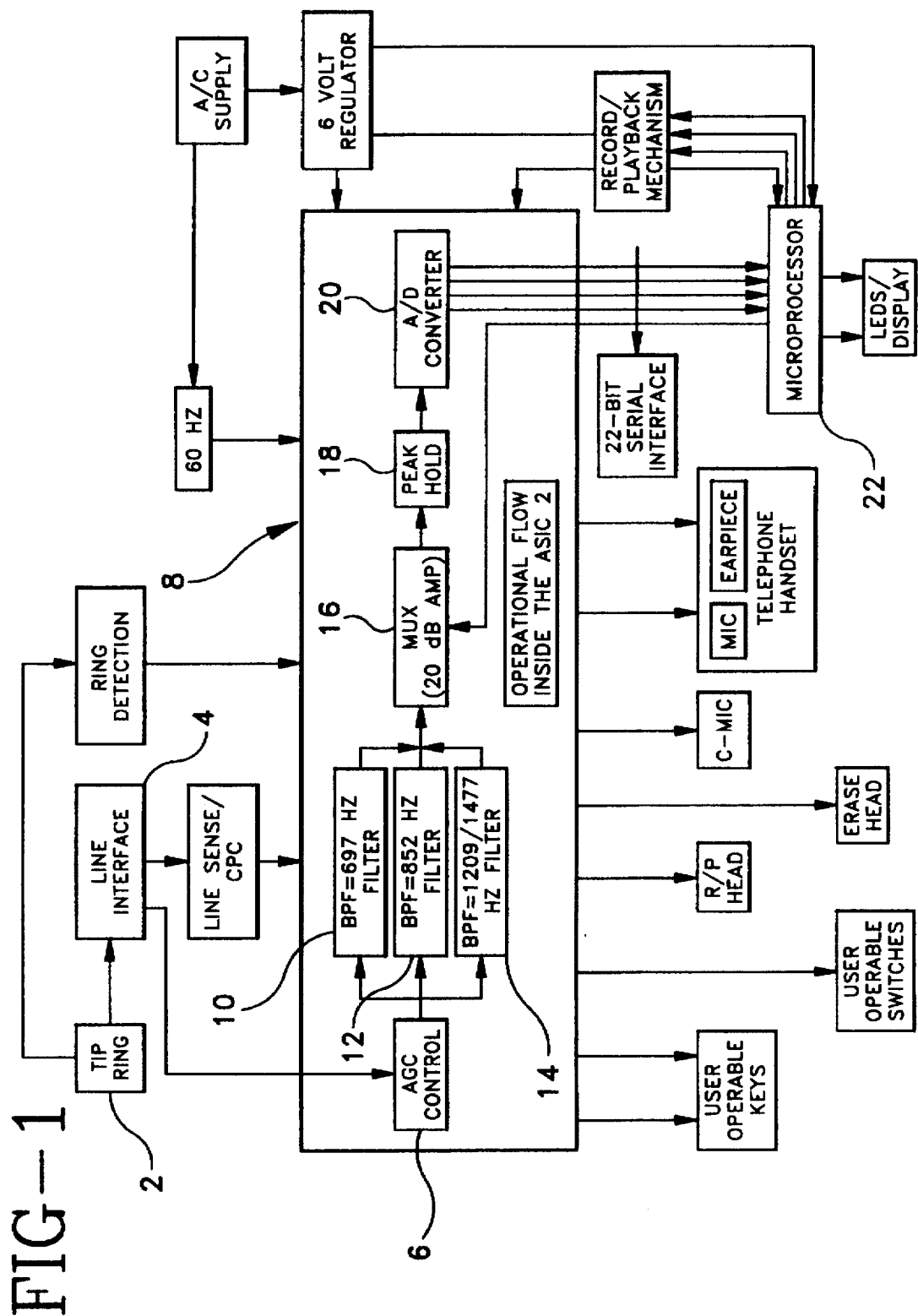
FIG. 1 is a block diagram of a first embodiment of the present invention.

The present invention provides an accurate, reliable and inexpensive DTMF detection circuit suitable for telephone answering device (TAD) applications. It uses a custom or application specific integrated circuit (ASIC) to perform the DTMF detection. The ASIC in the present invention uses inexpensive bandpass filters. The total number of filters used is a parameter left to the discretion of the TAD designer/manufacturer, but at least three filters are required. These filters are combined with other hardware and a software detection algorithm is used to implement the DTMF detection.

In one preferred embodiment of the present invention, as shown in FIG. 1, three second order bandpass filters 10, 12, 14 are used in the ASIC 8. The passbands of the first two bandpass filters 10, 12 in the ASIC 8 are centered around the frequencies of 697 and 852 Hz, respectively. The passband of the third bandpass filter 14 is centered around 1209 or 1477 Hz. The center frequency of the third bandpass filter 14 is determined under software control. By making the center frequency of the passband of the filter 14 controllable, this eliminates the need for a fourth filter, thus reducing the overall cost of the ASIC 8. The purpose of using two filters 10, 12 for the respective frequencies of 697 and 852 Hz, instead of one filter for both, is that the second filter's information is used to detect the presence of noise which would indicate that the incoming signal is not DTMF. In other words, two filters, either 10 and 14 or 12 and 14 are used to detect the frequencies of interest and the third filter, either 12 or 10 respectively, is used to confirm that the signal is "tone" (DTMF) and only "tone" (a DTMF signal is accepted only if the output of the third filter, 12 or 10, is negligible, indicating that no substantial noise is in the incoming signal).

The above frequencies, in specific pairs, correspond to the numbers 1, 3, 7 and 9 on a touch tone telephone keypad. For instance, by pressing the number 1 on a telephone keypad, signals at frequencies of both 697 and 1209 Hz are transmitted. Of course, this embodiment could be modified to accept more digits by adding more filters. Also, digits other than 1, 3, 7, 9 could be accepted by changing or switching the center frequencies of the existing filters. If the only DTMF digits to be accepted are 1, 3, 7 and 9, then the corresponding frequencies would be as follows:

|    |        | 1209 Hz | 1477 Hz |
|----|--------|---------|---------|
| L1 | 697 Hz | 1       | 3       |
| L2 | 852 Hz | 7       | 9       |

For simplicity, 697 Hz will hereafter be referred to as L1, 852 Hz as L2, 1209 Hz as H1 and 1477 Hz as H2. Therefore, to get 1, 3, 7 or 9, one needs to see combinations of L1H1, L1H2, L2H1 or L2H2, respectively.

The approach discussed above is very easily implemented into an ASIC, particularly one made using a low cost CMOS process, because switched capacitor filters can be used to implement the three required bandpass filters. Switched capacitor filters are known and are described, for example, in Application Note ANO61/0389 of SGS-Thomson Microelectronics, pages 955–968, the contents of which are incorporated herein by reference. Switched capacitor filters have the advantage of not only being accurate and simple to manufacture, but they are also simple to switch from one center frequency to another. Therefore, the three filter integrated circuit approach described above, using switched capacitor filters for all of the bandpass filters by means of switching the bandpass of each of the respective filters to different center frequencies, could cover the entire twelve digit keypad. For example, the first filter 10 could have switchable center frequencies of 697/717 Hz, the second filter 12 could have switchable center frequencies of 852/ 921 Hz, and the third filter 14 could have switchable center frequencies of 1209/1336/1477 Hz. The controller of the system could, therefore, change these filters to different sets of center frequencies (by using the switched capacitor technique) to detect any combination of DTMF signals.

In a typical embodiment of the invention, the bandpass filters 10, 12, 14 each have a quality factor Q of about 20, where Q=fo/Bandwidth, and where fo is the center frequency of the filter. Other quality factors could be used, depending upon system requirements.

A further improvement of the technique of the present invention is that the outputs of the bandpass filters 10, 12, 14 are sampled individually on a periodic basis. This allows for the use of only one detector 16, 18 and one A/D converter 20 because the circuit does not have to simultaneously detect all the filter outputs. In order to detect all the filter outputs simultaneously, multiple detectors 16, 18 and multiple A/D converters 20 would be required, thus adding much more cost to the apparatus.

FIG. 1 illustrates a block diagram showing the hardware that comprises the DTMF detection circuit. FIG. 1 also shows various other elements of a telephone answering device (TAD) in generalized blocks, all of which are known. The signal that comes from the telephone line 2 is passed through a line interface circuit 4 and is conditioned with an automatic gain control (AGC) circuit 6, after which it is sent through the detection circuit which includes the three parallel-connected bandpass filters 10, 12, 14, the single multiplexer 16 and the single peak hold circuit 18. The AGC circuit 6 compensates for variations in input signal level on the telephone line (tip, ring 2) and provides a substantially constant level input signal to the detection circuit. The output of each filter 10, 12, 14 is sampled serially through the sampling section which includes the multiplexer 16 and the peak hold circuit 18. The signal is amplified in the multiplexer 16 and is sent to the peak hold circuit 18, where the signal's level is held long enough for it to be converted by the A/D converter 20 to its digital representation. The digitized signal is then sent from the A/D converter 20 to the microprocessor 22.

The next phase of DTMF detection is controlled by software. Once the signal is digitized in the A/D converter 20, it is sampled at predetermined time intervals in the micropressor 22 and all related information and critical decisions are kept and updated under software control by the micropressor 22. For the DTMF algorithm to begin or continue processing, the signal level of at least one of the three filter outputs must be greater than an established reference level.

In FIGS. 2A and 2B, a flowchart describing the operation of the software is shown. The flowchart discloses the periodic sampling approach described above. The various units such as counters, etc., referred to in the following description of FIGS. 2A and 2B, are all implemented by the micropressor 22 under software control. This approach uses a 6 ms interrupt to sample the outputs of the filters. In steps S1 and S2, the interrupt counter is incremented. Depending on the value of the interrupt counter (in microprocessor 22), either the L1(697 Hz), L2(852 Hz) or the H1/H2(1209/1477 Hz) filter is sampled. See Steps S3–S8 in FIG. 2A.

The sampled signals are put through a series of tests to reject false signals and to validate the tones which comprise the remote access code. Whenever a particular filter output is below the established reference threshold (steps S9, S10, S11), the software clears the corresponding frequency detection flag, i.e. the L1/L2/H1/H2 flags (see steps S12–S14). Since any frequency below the reference is not valid DTMF, the "no frequency counter" (in microprocessor 22) is incremented (step S19) and checked to determine if it is equal to or greater than three (step S20). If so, the DTMF sample counter, the L1/L2/H1/H2 flags and the no frequency counter are cleared (set to zero). See steps S21 and S22. Next, in step S23, the preDTMF flag is tested. If it is clear, the DTMF detected flag is cleared and the routine exits the interrupt. If the preDTMF flag is set, the end of a DTMF tone has been detected and the DTMF detected flag is set to inform the application routine (refer to FIG. 3) that a DTMF command has been detected. Then, the preDTMF flag is cleared and the routine exits the interrupt. See steps S23–S26.

When a filter output is above the established reference threshold or level, the corresponding flag is set and the no frequency counter is cleared (steps S15–S18) since a valid frequency level is being received. If the DTMF sample counter is equal to or greater than seven (i.e., if seven or more valid DTMF samples have been detected), the DTMF sample is accepted as a valid signal (step S27), and the routine flows to step S38 in FIG. 2B. If less than seven valid DTMF samples have been received, the L1, L2 and H1/H2 flags are checked (step S28 and S29). If the H1/H2 flag and at least one of the L1 and L2 flags are set, a potential DTMF signal has been detected, and further tests will be run to check the validity of the signal.

Once a valid pair of frequencies is received and detected, the DTMF sample count is incremented and checked (step S30). If the sample count is one (step S31), it is only the first sample, and the L1/L2/H1/H2 detection flags are cleared (step S33) in order to enable detection of the next frequency pair. When the second pair of DTMF signals is detected, the DTMF signal is decoded (step S32) by comparing L1 to L2, since either H1 or H2 is already present. In the decoding process, if the 697 Hz filter output is greater than the 852 Hz filter output, either 1 or 3 is being pressed. If the 697 Hz filter output is less than the 852 Hz filter output, 7 or 9 is being pressed. The setting of the H1/H2 filter determines which actual key is being pressed.

Once a DTMF digit has been detected, three tests are implemented during the duration of the key press to determine if the digit is really the appropriate DTMF digit or if it is voice, noise or an illegal digit being pressed. Short burst signals from, for example, cellular or cordless telephones, are tested differently, as described later hereinbelow. The three tests for normal DTMF signals are as follows:

1. If 1.3 multiplied by the output of the high filter (either H1 or H2) is less than the output of the low filter of interest (either L1 or L2), then an illegal, DTMF digit, such as 2, 5 or 8, is being pressed. See step S34.

2. If 0.67 multiplied by the valid low frequency (either L1 or L2) is less than the invalid low frequency (either L2 or L1 respectively), then there is noise or voice present. See step S35 in FIG. 2B.

3. If present DTMF sample is not equal to previous DTMF sample, then there is also noise or voice present. See step S37.

If the signal is a short burst signal (from a cellular/cordless telephone, for example) only the first two tests are implemented. There is not enough time to implement the third test because it takes more than 70 milliseconds (the approximate length of a short burst signal) to complete all three tests.

If one out of the three above tests fail, or if one of the two tests fail for short burst signals, the DTMF detected flag, the preDTMF flag (used to detect silence after the DTMF key is released), L1/L2/H1/H2 detected flags and the no frequency counter flag are all cleared (step S40 and S22 in FIG. 2A). If after the second DTMF sample, a DTMF signal is no longer present but the first two tests have passed, it is decided that a short burst signal is present (such as from a cordless and/or cellular telephone). See step S36. This signal is accepted as a valid security code signal. If at any time, the above three tests pass (or the first two tests pass for short burst signals), the preDTMF flag is set (step S38) and the L1/L2/H1/H2 flags are cleared (step S39). The routine is exited and is started over again to "look for" a next DTMF signal. During this time, the TAD detects the silence that occurs after the user stops pressing the DTMF key (steps S1–S11). After silence has been detected (S12–S14) (i.e., three signal samples with frequencies lower than the established reference have been received; S19 and S20), the preDTMF flag is checked to see if it was set (S23). If the preDTMF flag was set, a valid DTMF digit has been detected (S24). After three such digits have been detected, the TAD is able to be operated remotely (see FIG. 3, discussed below).

FIG. 3 is a flow chart that shows how a typical telephone answering device (TAD) application makes use of the present invention to detect a three digit remote (security) code. Upon entry into the routine, the security code pointer is set to one (1) in step S50. Next, the TAD begins the routine for recording an incoming message (step S51). The routine checks in step S52 to see if the next digit detected is either a one (1) or a seven (7). If YES, the H1/H2 filter is set to HI (step S53). If NO, the next digit to be detected must be a three (3) or a nine (9), and the H1/H2 filter is set to H2 (step S54). The routine then checks in step S55 to see if the DTMF detected flag is set. If the DTMF detected flag is not set, the TAD continues the incoming message record routine. If the DTMF detected flag is set, the routine compares the decoded digit to the next digit to be detected in step S56 and increments the security code pointer if they are equal (step S57). If the decoded digit is not equal to the next digit to be detected, the security pointer is set to one (1) step S58 and the incoming message record routine continues. This routine continues until the security code pointer is equal to four (indicating that the three digit remote code has been detected), at which point, the unit goes into remote mode (step S59).

The "remote mode" routine of the TAD of the present invention is the same as that of the conventional TAD, except for the above-described technique of detecting DTMF signals for use in remote access controlling of the TAD. After the DTMF signals are detected in accordance with the present invention, control of the TAD is remotely controlled by pressing various keys of the telephone keypad to send DTMF signals to the TAD as, for example, shown in U.S. Pat. No. 5,313,516 (Afshar et al).

The construction of the TAD of the present invention is conventional, except for the system described above with respect to FIGS. 1–3. The system of FIGS. 1–3 can be used in the control system of the TAD shown in, for example, U.S. Pat. No. 5,313,516, the entire contents of which are incorporated herein by reference.

While the invention has been described above with respect to specific embodiments and implementations, various modifications and alterations can be made within the scope of the present invention as defined in the appended claims.

We claim:

1. In a telephone answering device including a remote access mode which is operative responsive to dual tone multi-frequency (DTMF) signals, wherein input signals are coupled to a telephone line interface included in the telephone answering device, the improvement comprising:

at least three bandpass filters coupled to receive a signal from said line interface, each of said bandpass filters having a center frequency corresponding to a predetermined DTMF signal;

a sampling section coupled to receive outputs from all of said at least three bandpass filters for sampling outputs from all of said at least three bandpass filters, said sampling section including:

a multiplexer which receives said outputs from all of said at least three bandpass filters; and a single peak hold circuit coupled to an output of said multiplexer;

an analog-to-digital converter coupled to receive an output from said single peak hold circuit; and a controller coupled to an output of said analog-to-digital converter for detecting a predetermined sub-set of the DTMF signals, which sub-set contains fewer than the total number of available DTMF signals, and for controlling operations of the telephone answering device in a remote access mode responsive to detection of the predetermined sub-set of DTMF signals;

wherein at least one of said bandpass filters has a switchable center frequency which is dynamically switchable between at least two different center frequencies during detection of DTMF signals, which different center frequencies correspond to respective frequencies of DTMF signals.

2. The apparatus of claim 1, wherein said at least one bandpass filter having said switchable center frequency comprises a switched capacitor filter.

3. The apparatus of claim 2, wherein said at least three bandpass filters comprises only three bandpass filters which are all connected in parallel to each other and share a common input.

4. The apparatus of claim 2, wherein said at least three bandpass filters each comprise second order filters.

5. The apparatus of claim 1, wherein said at least three bandpass filters includes:

first and second bandpass filters having respective center frequencies corresponding to respective center frequencies of DTMF signals in said sub-set of DTMF signals; and a third bandpass filter having a different center frequency.

6. The apparatus of claim 5, wherein said third bandpass filter has a center frequency corresponding to one of the frequencies of a DTMF signal different from said DTMF signals corresponding to the center frequencies of said first and second bandpass filters.

7. The apparatus of claim 5, wherein said controller includes means for checking if said third bandpass filter has substantially no output, to thereby confirm that the input signal is a DTMF signal, and wherein said controller further includes means for accepting output signals from said first and second bandpass filters only when said third bandpass filter has substantially no output.

8. The apparatus of claim 5, wherein said controller includes means for checking that said first and second bandpass filters each have an output, and that said third bandpass filter has substantially no output, to thereby confirm that the input signal is a DTMF signal.

9. The apparatus of claim 5, wherein at least one of said bandpass filters has a switchable center frequency which is switchable between at least two different center frequencies which correspond to respective frequencies of DTMF signals.

10. The apparatus of claim 8, wherein at least one bandpass filter having said switchable center frequency comprises a switched capacitor filter.

11. The apparatus of claim 5, wherein said at least three bandpass filters comprises only three bandpass filters which are all connected in parallel to each other and share a common input.

12. The apparatus of claim 5, wherein said at least three bandpass filters each comprise second order filters.

13. The apparatus of claim 1, wherein said at least three bandpass filters comprises only three bandpass filters which are all connected in parallel to each other and share a common input.

14. The apparatus of claim 1, wherein said at least three bandpass filters, multiplexer, single peak hold circuit and analog-to-digital converter are all included in an integrated circuit.

15. The apparatus of claim 14, further comprising an automatic gain control circuit coupling an output of said line interface to said bandpass filters.

16. The apparatus of claim 15, wherein said automatic gain control circuit is included in said integrated circuit.

17. The apparatus of claim 1, further comprising an automatic gain control circuit coupling an output of said line interface to said bandpass filters.

18. The apparatus of claim 17, wherein said automatic gain control circuit couples the output of said line interface to all of said bandpass filters.

19. The apparatus of claim 1, wherein:
outputs of said at least three bandpass filters are sampled individually and sequentially on a periodic basis by said sampling section and
said sampling section has a single multiplexer and said single peak hold circuit for sampling outputs of all of said at least three bandpass filters.

20. The apparatus of claim 1, wherein said controller has a control output coupled to said sampling section for controlling sampling of the outputs of said bandpass filters by said sampling section.

21. The apparatus of claim 20, wherein said control output of said controller is coupled to said multiplexer of said sampling section.

22. The apparatus of claim 1, wherein said at least three bandpass filters each comprise second order filters.

23. The apparatus of claim 1, wherein at least one of said bandpass filters comprises a switched capacitor filter having switchable center frequencies.

24. The apparatus of claim 1, wherein said controller includes timing means for detecting short burst DTMF signals.

25. A method of operating a telephone answering device which has a remote access mode which is operative responsive to dual tone multi-frequency (DTMF) signals, and wherein input signals are coupled to a telephone line interface included in the telephone answering device, the method comprising:

providing at least three bandpass filters coupled to receive a signal from said line interface, each of said bandpass filters having a center frequency corresponding to a predetermined DTMF signal;

sampling outputs from all of said at least three bandpass filters by means of a multiplexer which receives said outputs from all of said at least three bandpass filters, and a single peak hold circuit coupled to an output of said multiplexer;

converting an analog output from said peak hold circuit to produce digital signals;

detecting, from said produced digital signals, a predetermined sub-set of DTMF signals, which sub-set contains fewer than the total number of available DTMF signals;

controlling operations of the telephone answering device in a remote access mode responsive to the detected predetermined sub-set of DTMF signals;

providing at least one of said bandpass filters with a dynamically switchable center frequency which is switchable between at least two different center frequencies during detection of DTMF signals, which different center frequencies correspond to respective frequencies of DTMF signals.

26. The method of claim 25, comprising providing said at least one bandpass filter having said switchable center frequency as a switched capacitor filter and wherein said center frequency is switched under software control.

27. The method of claim 25, comprising connecting all of said at least three bandpass filters in parallel with each other so as to share a common input.

28. The method of claim 25, wherein said step of providing said at least three bandpass filters includes:
providing first and second bandpass filters having respective center frequencies corresponding to respective center frequencies of DTMF signals in said sub-set of DTMF signals; and
providing a third bandpass filter having a different center frequency.

29. The method of claim 28, wherein said detecting step comprises checking if said third bandpass filter has substantially no output, to thereby confirm that the input signal is a DTMF signal.

30. The method of claim 29 wherein said detecting step checks if both of said first and second bandpass filters have an output, to thereby confirm that the input signal is a DTMF signal, and wherein said controlling step permits a remote access mode only when (i) both of said first and second bandpass filters have an output and (ii) said third bandpass filter has substantially no output.

31. The method of claim 28, comprising connecting all of said at least three bandpass filters in parallel with each other so as to share a common input.

32. The method of claim 25, comprising connecting all of said at least three bandpass filters in parallel with each other so as to share a common input.

33. The method of claim 25, comprising providing said bandpass filters, multiplexer,, single peak hold circuit and an analog-to-digital converter in an integrated circuit.

34. The method of claim 33, further comprising automatically controlling the gain of said signal supplied to said bandpass filters.

35. The method of claim 34, comprising providing an automatic gain controlling circuit in said integrated circuit.

36. The method of claim 25, comprising sampling outputs of said at least three bandpass filters individually and sequentially on a periodic basis by a single multiplexer and said single peak hold circuit.

37. The method of claim 25, wherein said step of controlling comprises controlling sampling of the outputs of said bandpass filters.

38. The method of claim 37, wherein said step of sampling comprises controlling operation of said multiplexer.

39. The method of claim 25, wherein said at least three bandpass filters are each provided as second order filters.

40. The method of claim 25, comprising providing at least one of said bandpass filters as a switched capacitor filter having switchable center frequencies.

41. The method of claim 25, further comprising detecting short burst DTMF signals using a timer.

42. In a telephone answering device including a remote access mode which is operative responsive to dual tone multifrequency (DTMF) signals, wherein input signals are coupled to a telephone line interface included in the telephone answering device, the improvement comprising:

at least three bandpass filters coupled to receive a signal from said line interface, each of said bandpass filters having a center frequency corresponding to a predetermined DTMF signal;

a sampling section coupled to receive outputs from all of said at least three bandpass filters for sampling outputs from all of said at least three bandpass filters, said sampling section including:

a multiplexer which receives said outputs from all of said at least three bandpass filters; and a single peak hold circuit coupled to an output of said multiplexer;

an analog-to-digital converter coupled to receive an output from said single peak hold circuit; and a controller coupled to an output of said analog-to-digital converter for detecting a predetermined sub-set of the DTMF signals, which sub-set contains fewer than the total number of available DTMF signals, and for controlling operations of the telephone answering device in a remote access mode responsive to detection of the predetermined sub-set of DTMF signals;

wherein said at least three bandpass filters includes:
first and second bandpass filters having respective center frequencies corresponding to respective center frequencies of DTMF signals in said sub-set of DTMF signals; and
a third bandpass filter having a different center frequency; and wherein said controller includes means for checking if said third bandpass filter has substantially no output, to thereby confirm that the input signal is a DTMF signal, and wherein said controller further includes means for accepting output signals from said first and second bandpass filters only when said third bandpass filter has substantially no output.

43. In a telephone answering device including a remote access mode which is operative responsive to dual tone multi-frequency (DTMF) signals, wherein input signals are coupled to a telephone line interface included in the telephone answering device, the improvement comprising:

at least three bandpass filters coupled to receive a signal from said line interface, each of said bandpass filters having a center frequency corresponding to a predetermined DTMF signal;

a sampling section coupled to receive outputs from all of said at least three bandpass filters for sampling outputs from all of said at least three bandpass filters, said sampling section including:

a multiplexer which receives said outputs from all of said at least three bandpass filters; and a single peak hold circuit coupled to an output of said multiplexer;

an analog-to-digital converter coupled to receive an output from said single peak hold circuit;

a controller coupled to an output of said analog-to-digital converter for detecting a predetermined sub-set of the DTMF signals, which sub-set contains fewer than the total number of available DTMF signals, and for controlling operations of the telephone answering device in a remote access mode responsive to detection of the predetermined sub-set of DTMF signals;

wherein said at least three bandpass filters includes:
first and second bandpass filters having respective center frequencies corresponding to respective center frequencies of DTMF signals in said sub-set of DTMF signals; and
a third bandpass filter having a different center frequency; and wherein said controller includes means for checking that said first and second bandpass filters each have an output, and that said third bandpass filter has substantially no output, to thereby confirm that the input signal is a DTMF signal.

44. A method of operating a telephone answering device which has a remote access mode which is operative responsive to dual tone multi-frequency (DTMF) signals, and wherein input signals are coupled to a telephone line interface included in the telephone answering device, the method comprising:

providing at least three bandpass filters coupled to receive a signal from said line interface, each of said bandpass filters having a center frequency corresponding to a predetermined DTMF signal;

sampling outputs from all of said at least three bandpass filters by means of a multiplexer which receives said outputs from all of said at least three bandpass filters, and a single peak hold circuit coupled to an output of said multiplexer;

converting an analog output from said peak hold circuit to produce digital signals; and detecting, from said produced digital signals, a predetermined sub-set of DTMF signals, which sub-set contains fewer than the total number of available DTMF signals;

controlling operations of the telephone answering device in a remote access mode responsive to the detected predetermined sub-set of DTMF signals;

wherein said step of providing said at least three bandpass filters includes:
providing first and second bandpass filters having respective center frequencies corresponding to respective center frequencies of DTMF signals in said sub-set of DTMF signals; and
providing a third bandpass filter having a different center frequency;

wherein said detecting step comprises checking if said third bandpass filter has substantially no output, to thereby confirm that the input signal is a DTMF signal; and wherein said detecting step checks if both of said first and second bandpass filters have an output, to thereby confirm that the input signal is a DTMF signal, and wherein said controlling step permits a remote access mode only when (i) both of said first and second bandpass filters have an output and (ii) said third bandpass filter has substantially no output.

* * * * *

UNITED STATES PATENT AND TRADEMARK OFFICE
CERTIFICATE OF CORRECTION

PATENT NO. : 5,699,421
DATED : December 16, 1997
INVENTOR(S) : NIRSHBERG et al

It is certified that error appears in the above-identified patent and that said Letters Patent is hereby corrected as shown below:

Column 9, line 14 (claim 10, line 1), change "of claim 8" to --of claim 9--;

Column 10, line 26 (claim 27, line 1), change "of claim 25" to --of claim 26--.

Signed and Sealed this

Eighth Day of February, 2000

Attest:

Attesting Officer

Q. TODD DICKINSON

Commissioner of Patents and Trademarks